US008825066B2

(12) United States Patent
Roessel et al.

(10) Patent No.: US 8,825,066 B2
(45) Date of Patent: Sep. 2, 2014

(54) APPARATUS AND METHOD FOR INTERWORKING BETWEEN MULTIPLE FREQUENCY BAND MODES

(75) Inventors: Sabine Roessel, Munich (DE); Michael Schopp, Ulm (DE); Matti Jokimies, Salo (FI)

(73) Assignee: Nokia Corporation, Espoo (FI)

( * ) Notice: Subject to any disclaimer, the term of this patent is extended or adjusted under 35 U.S.C. 154(b) by 1185 days.

(21) Appl. No.: 12/485,647

(22) Filed: Jun. 16, 2009

(65) Prior Publication Data
US 2010/0317356 A1 Dec. 16, 2010

(51) Int. Cl.
H04W 72/00 (2009.01)
H04W 72/04 (2009.01)

(52) U.S. Cl.
CPC .................. *H04W 72/0406* (2013.01)
USPC ..... 455/450; 455/434; 455/550.1; 455/422.1; 370/329; 370/355

(58) Field of Classification Search
CPC ........................ H04W 40/12; H04W 74/0866
See application file for complete search history.

(56) References Cited

U.S. PATENT DOCUMENTS 6,188,904 B1 * 2/2001 Marsan .......................... 455/450
8,064,409 B1 * 11/2011 Gardner et al. ............... 370/335
2007/0019575 A1 1/2007 Shaheen
2009/0088131 A1 * 4/2009 Gholmieh et al. ............ 455/410
2009/0323608 A1 * 12/2009 Adachi et al. ................. 370/329

FOREIGN PATENT DOCUMENTS

KR 20080005691 A 1/2008

OTHER PUBLICATIONS

International Search Report and Written Opinion, received in corresponding Patent Cooperation Treaty Application No. PCT/IB2010/001183, dated Oct. 12, 2010, 13 pages.
3GPP TS 36.300 V8.8.0 (Mar. 2009). Technical Specification Group Radio Access Network; Evolved Universal Terrestrial Radio Access (E-UTRA) and Evolved Universal Terrestrial Radio Access Network (E-UTRAN). Overall description; Stage 2 (Release 8). 38 pages.

* cited by examiner

*Primary Examiner* — Rafael Pérez-Gutiérrez
*Assistant Examiner* — Keith Fang
(74) *Attorney, Agent, or Firm* — Squire Patton Boggs (US) LLP

(57) ABSTRACT

In accordance with an example embodiment of the present invention, a method is disclosed that comprises signaling by a user equipment (UE) to indicate a support for at least a second frequency band mode in addition to a first frequency band mode, wherein the first frequency band mode and the second frequency band mode have at least one overlapping frequency channel; and receiving from a base station at least one resource allocation message to allocate at least one of a downlink channel and an uplink channel that complies to at least one of a plurality of radio frequency (RF) restrictions of the second frequency band mode.

19 Claims, 5 Drawing Sheets

APPARATUS AND METHOD FOR INTERWORKING BETWEEN MULTIPLE FREQUENCY BAND MODES

TECHNICAL FIELD

The present application relates generally to an apparatus and a method for interworking between multiple frequency band modes.

BACKGROUND

A wireless standard may define one or more frequency band modes and a frequency band mode may designate a radio frequency (RF) band and a set of operational RF restrictions. The frequency band may be divided into a set of frequency channels and the RF restriction may define the allowed frequency channel bandwidths, transmitting power level, spectrum emission mask, a receiver frequency filter, and the like. Thus, a user equipment (UE) in compliance with one frequency band mode may communicate with and roam into a wireless network that supports the same frequency band mode.

It is not uncommon that one frequency band mode has overlapping frequency channels with another frequency band mode. For example, the UEs of the first frequency band mode may roam into a wireless cell of the second frequency band mode. Yet, the UE of the first frequency band mode may not be able to communicate with the base station due to the differences in the RF restrictions of the two frequency band modes. One example of multiple frequency band modes is the Band 17 and Band 12 of Long Term Evolution (LTE) standard Release 8 as defined by $3^{rd}$ Generation Partnership Project (3GPP). The frequency band mode supported by the UE may be indicated to the network in a UE capability signaling. The frequency band mode supported by the network may be signaled to the UE in a broadcast signaling. A specific frequency numbering scheme is associated with each frequency band mode.

SUMMARY

Various aspects of the invention are set out in the claims.

In accordance with an example embodiment of the present invention, a method comprises signaling by a user equipment (UE) to indicate a support for at least a second frequency band mode in addition to a first frequency band mode, wherein the first frequency band mode and the second frequency band mode have at least one overlapping frequency channel; and receiving from a base station at least one resource allocation message to allocate at least one of a downlink channel and an uplink channel that complies to at least one of a plurality of radio frequency (RE) restrictions of the second frequency band mode.

In accordance with an example embodiment of the present invention, an apparatus that comprises a transceiver; a memory unit; and a module configured to broadcast a signaling message to indicate a support for at least a first frequency band mode in addition to a second frequency band mode, wherein the first frequency band mode and the second frequency band mode have at least one overlapping frequency channel; to receive a second signaling message to indicate a support for at least the second frequency band mode in addition to the first frequency band mode; and allocate a downlink channel to the UE according to a plurality of radio frequency (RF) restrictions of the second frequency band mode.

In accordance with another example embodiment of the present invention, an apparatus comprise a transceiver; a memory unit; and a module configured to indicate with a first signaling message a support for at least a second frequency band mode in addition to a first frequency band mode, wherein the first frequency band mode and the second frequency band mode have at least one overlapping frequency channel; to receive from a base station at least one resource allocation message to allocate at least one of a downlink channel and an uplink channel that complies to at least one of a plurality of radio frequency (RF) restrictions of the second frequency band mode; and to adjust uplink transmission behavior to comply with the at least one of the RF restrictions of the second frequency band mode.

BRIEF DESCRIPTION OF DRAWINGS

For a more complete understanding of example embodiments of the present invention, reference is now made to the following descriptions taken in connection with the accompanying drawings in which.

DETAILED DESCRIPTION

When a user equipment (UE) with one frequency band mode roams into a cell that supports a different frequency band mode, the UE may not work with the new base station, despite the fact that the UE frequency band mode and the base station frequency band mode have overlapping frequency channels. This is at least in part because the two frequency band modes may have different RF restrictions such as receiver frequency filter, spectrum emission mask, transmitting powers, and the like. In the legacy solutions, in order to support the frequency band modes with overlapping frequencies, the UEs need to comply with the requirements of the both frequency band modes. In these cases, UE needs to be built to fulfill all RF restrictions of the base station's frequency band mode, in order to work with and utilize the services offered by the base station. One drawback of this UE implementation may be higher implementation cost of RF components in the UE.

One cost-effective solution to the issue of interworking between two different frequency band modes may be to have an adaptive resource allocation at the base station and adaptive behavior at the UE. Additionally, the signaling of frequency band mode and numbering schemes may be modified to facilitate the adaptive behavior. The base station may allocate downlink to the UE in such a way that the interference caused by other radio systems in nearby channels to the data received by the UE on the allocated downlink channel is minimal. The UE may adjust its transmitting power level or spectrum emission mask on an uplink channel to comply with a tighter transmitting power restriction of the base station frequency band mode.

An example embodiment of the present invention and its potential advantages are best understood by referring to FIGS. 1 through 5 of the drawings, like numerals being used for like and corresponding parts of the various drawings.

Figure 1:
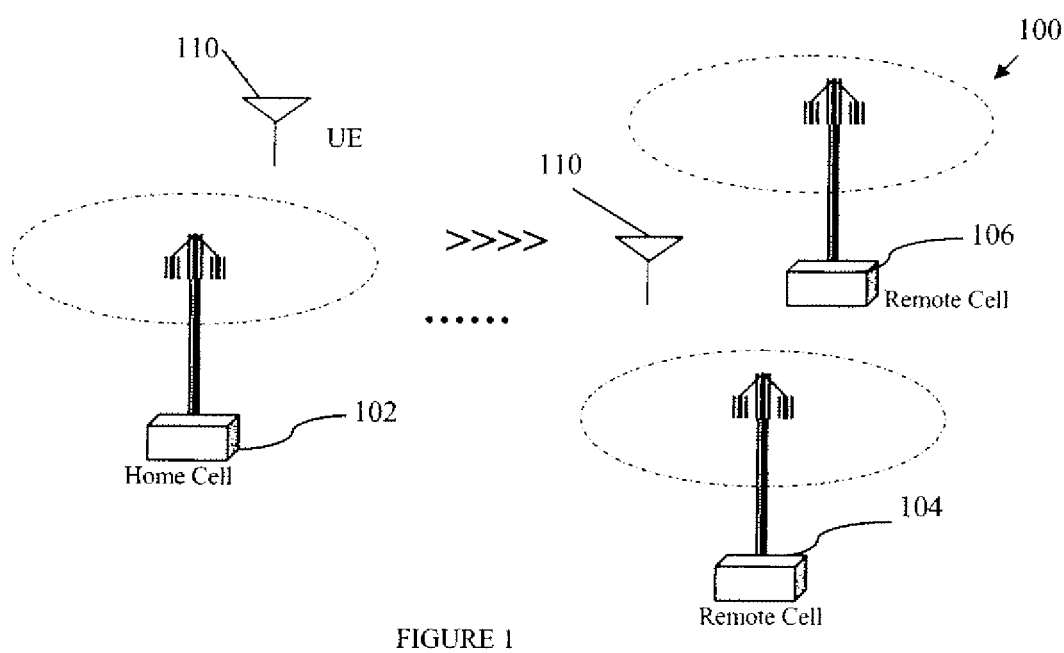
FIG. 1 illustrates one wireless system supporting multiple frequency band modes.

FIG. 1 illustrates a wireless system 100 supporting multiple frequency band modes. The wireless system 100 may include a serving cell and base station 102, a remote cell and base station 104, another remote cell and base station 106, and a UE 110. The serving base station 102 and the UE 110 may support a first frequency band mode as the native frequency band mode. The remote cell 104 may support a second frequency band mode that may be different from the first frequency band mode but the two frequency band modes may have at least one overlapping RF channel. The remote cell 104 may be located nearby or as far away from the home cell 102 as in a different country. The cell 104 may be a part of a network, which may also include the cell 106. The cell 106 may also support a third frequency band mode, without overlapping RF channels with the first or second frequency band mode.

In this disclosure, for clarity of presentation without loss of generality, it is assumed that a base station has a one-to-one relationship with a cell while base station refers to a wireless system covering a specific area called cell. When there is no ambiguity, the term cell and the term base station may be used interchangeably.

FIG. 1 may illustrate an example scenario for the interworking of the two different frequency band modes. As the UE 110 roams away from the home cell 102, and near the remote cell 104, the UE 110 may receive a broadcast signaling message from the remote cell 104 to inform the UE 110 that the remote base station 104 can support the UE frequency band mode, in addition to its native frequency band mode. The UE may be in an idle state or an active state. In the idle state the UE 110 may not have two-way messaging exchange connection with the base station 104, except for the initial signaling required to establish the connection with the base station 104. Furthermore, the UE 110 in the idle state may reselect the cell 104 based on a number of criteria. These criteria may include parameters transmitted by the base station 104 in broadcast messages, and the measured quantities of the signals transmitted by the base station 104. If the criteria are met, UE 110 in the idle state may reselect the remote cell 104 to enter. In the active state, the UE 110 may have originated a call when communicating with the remote cell 106, and the UE 110 may have a message exchange to hand over the active call to the remote cell 104. Prior to the handover, the remote cell 104 may have allocated via the remote cell 106 the resources to be used in cell 104 to the UE 110. The remote cell 104 may allocate at least one of the overlapping channels in such a way that the RF restrictions of both the frequency band mode of the UE 110 and that of the remote cell 104 are respected.

Figure 2A:
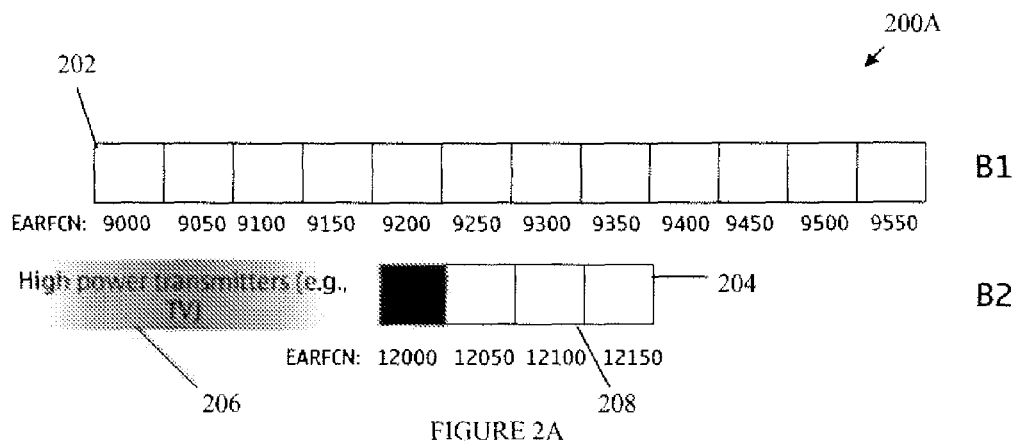
FIGS. 2A and 2B illustrate examples of frequency channel overlapping of two different frequency band modes.
Figure 2B:
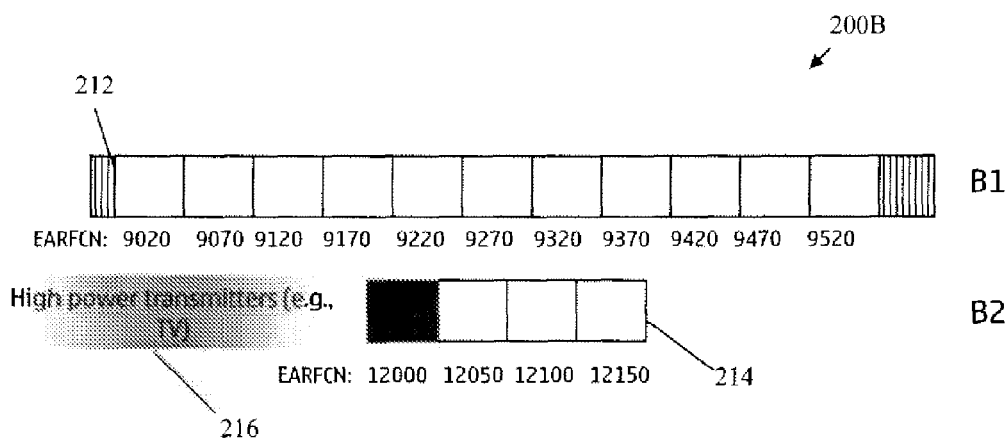

FIGS. 2A and 2B illustrate two examples of overlapping RF channels of two different frequency band modes. FIG. 2A shows an example 200A of a frequency channel set 202 for the frequency band mode B1 and another frequency channel set 204 for another frequency band mode B2. The frequency channel set 202 of the frequency band mode B1 may include twelve frequency channels, numbered from 9000 to 9550, with a 5 MHz bandwidth for each channel. The frequency channel set 204 of the frequency band mode B2 may include two parts, a TV broadcast channel 206 with a high transmitting power and a set of four frequency channels numbered from 12000 to 12150, similar to the LTE channel numbering scheme, with an Evolved Universal Terrestrial Radio Access (E-UTRA) Absolute RF Channel Number (EARFCN).

FIG. 2A shows an example of full channel overlapping between the channels of two different frequency band modes. The frequency channel set 204 of the frequency band B2 fully overlaps the frequency channel set 202 of the frequency band mode B1. The four 5-MHz channels of the frequency band mode B2, numbered 12000 to 12150, fully overlap the four channels of the frequency band mode B1 numbered 9200 to 9350. Each of the overlapping channels may have the same 5-MHz bandwidth and are fully aligned on the radio frequencies. But the overlapping channels are numbered differently because each frequency band mode may have a different channel numbering scheme.

FIG. 2B shows an example 200B of a frequency channel set 212 of the frequency band mode B1 and another frequency channel set 214 of the frequency band mode B2. The frequency channel set 212 may include eleven frequency channels, numbered from 9000 to 9520, with a 5 MHz bandwidth for each channel. The frequency channel set 214 for the frequency band mode B2 may include a set of four frequency channels numbered from 12000 to 12150, similar to the EARFCN channel number scheme. The frequency channels below the frequency channel set 214 may be occupied by the channel 216, belonging to a system with a high transmitting power such as a TV broadcast system.

FIG. 2B shows an example of partial channel overlapping between two frequency band modes. Similar to the example illustrated in FIG. 2A, the frequency channel set 214 of the frequency band mode B2 partially overlaps the frequency channel set 212 of the frequency band mode B1. Each of the four 5-MHz channels of the frequency band mode B2, numbered 12000 to 12150, partially overlaps the channels, numbered 9170 to 9370, of the frequency hand mode B1. For example, the channel 12000 of the frequency band mode B2 partially overlaps the frequency channel 9220 of the frequency band mode B1. Each of the overlapping channels may have the same 5-MHz bandwidth, but different center frequencies, and is only partially aligned on the radio frequencies. Even though the 5 MHz bandwidth is used in the examples 200A and 200B above, bandwidths may vary between frequency band modes and within one frequency band mode.

FIGS. 2A and 2B may be used to show an example of the interworking between different frequency band modes in the wireless network of FIG. 1. The UE 110 of FIG. 1 may have the frequency band mode B2 of FIG. 2A and FIG. 2B, as its native frequency band mode. The UE 110 may roam into the wireless network as shown in FIG. 1, where the base station 104 may support the second frequency band mode, B1, as its native frequency band mode. The UE 110 may have entered an active state, and initiated a call, by communicating with the base station 106. The base station 106 may support a third frequency band mode that may be different from the frequency band modes B1 and B2. When the UE 110 moves towards the base station 104, the call may be handed over to the base station 104, depending on the RF restrictions of the UE 110. For example, if the channels of the frequency band of the base station 104 are arranged as shown in FIG. 2A, without other constraints, the resources may be allocated to the UE 110, if the center frequency of the 5 MHz channel used by the base station 104 is 9200, 9250, 9300, or 9350. In case that the channels on the frequency band of the base station 104 are arranged as shown in FIG. 2B without other constraints, the resources may be allocated to the UE 110, if the center frequency of the 5 MHz channel used by the base station 104 is 9220, 9270, or 9320.

Figure 3:
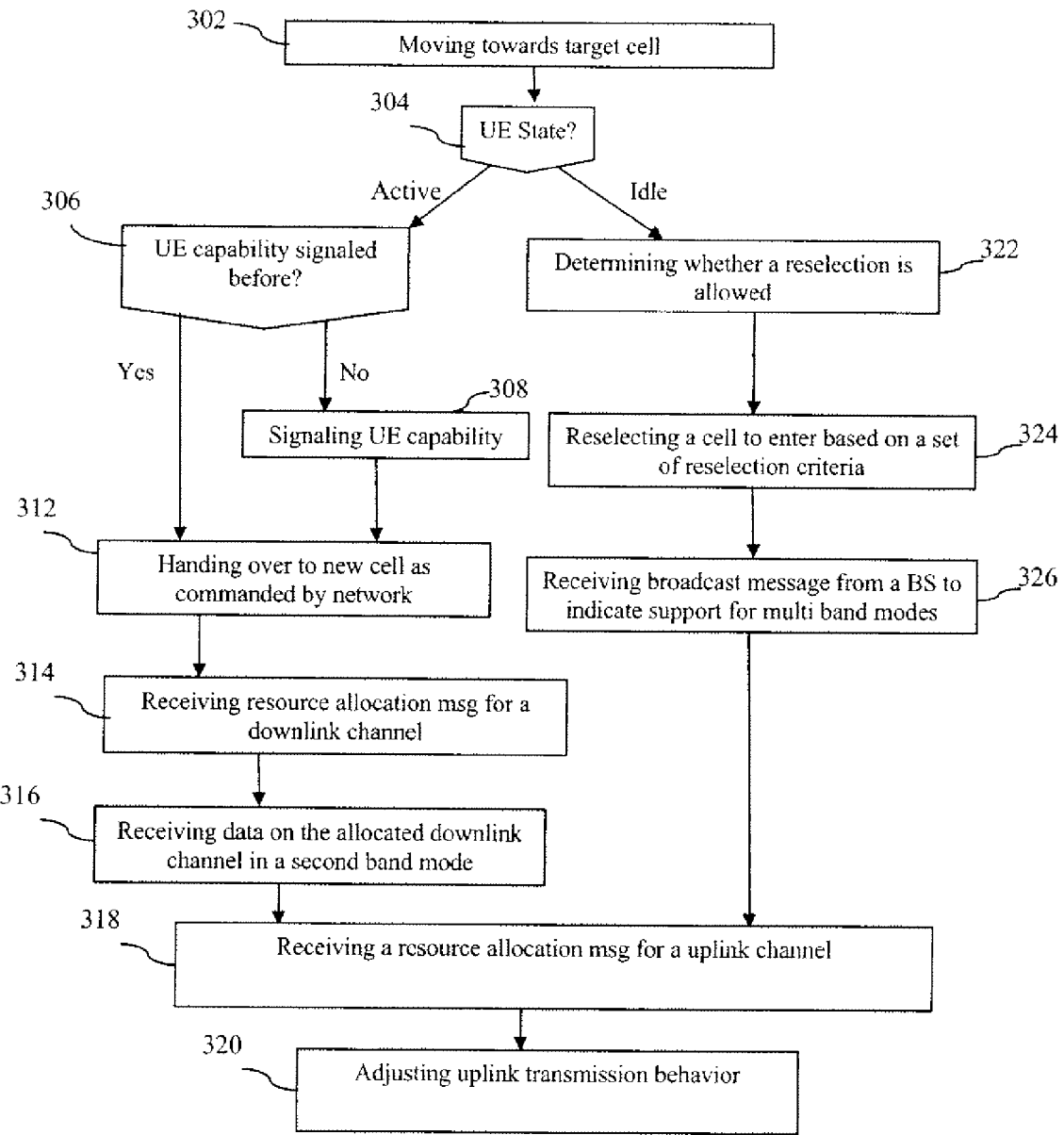
FIG. 3 illustrates an example method for supporting interworking between multiple frequency band modes at a UE.

FIG. 3 illustrates an example method 300 for support of interworking between multiple frequency band modes at a UE when the UE enters a new cell in either an active call state or an idle state. In one example embodiment, the method 300 may be implemented in the UE 110 of FIG. 1 or the wireless device 500 of FIG. 5. The method 300 is for illustration only and the steps of the method 300 may arranged be in a different sequence without departing from the invention of this example embodiment.

As the UE 110 enters the coverage areas of one or more cell at indicated at block 302, the UE 110 may be in either an active state or idle state as determined at block 304. When in the active state, the UE 110 may check whether it has signaled its capability to support multiple frequency band modes before at block 306. The UE 110 may have signaled its support to the network earlier, and the signaling connections between the network elements are used to convey the UE's capability to the base stations. If not, the UE may signal its capability to support multiple frequency band modes to a coupled base station 104 of FIG. 1 at block 308. Signaling to indicate its support for multiple frequency band modes at block 308 may include sending a signaling message to the remote cell 104 or to the remote cell 106 to indicate support for a first frequency band mode as its native frequency bode and a support of a second frequency band mode with the RF restrictions of the first frequency band mode. If the signaling message is sent to the remote cell 106, the message is made available to cell 104. This UE signaling may be done in conjunction with general UE capability signaling as specified for the standards such as LTE.

If the UE capability is found/confirmed to be already signaled at block 306, the method 300 continues on to handling over the UE to a new cell as commanded by the network at block 312. Handing over to the new cell 104 at block 312 may be same as handing over of the UE 110 in the example of FIG. 1, which may be initiated and controlled by the remote cell 106 in coordination with the remote cell 104.

The method 300 may then include receiving a resource allocation message for a downlink channel at block 314, and receiving data on the allocated downlink in a second frequency band mode at block 316. Receiving a resource allocation message to allocate a downlink channel at block 314 may include receiving a message that allocate a downlink channel that is one of the overlapping frequency channels between the UE 110 frequency band mode and the remote cell 104 frequency band mode. The resource allocation message may include further information on the allocated downlink, such as center of the frequency channel, channel bandwidth, receiver frequency filter and the like. Alternatively, the UE 110 may have the pre-stored knowledge about the frequency band mode of the remote cell 104.

Receiving data on the allocated downlink at block 316 may include using the frequency filter of the second frequency band mode, the native frequency band mode of the cell 104, to receive data signals on the allocated downlink. The frequency filter of the second frequency band mode may be stricter than the frequency filter of the first frequency band mode, or the native frequency band mode of the UE 110. The allocated downlink channel may entirely overlap a channel of the native frequency band mode of the UE 110 as illustrated in the example 200A of FIG. 2A. In another embodiment, the allocated downlink channel may partially overlap a channel of the native frequency band mode of the UE 110, as illustrated in the example 200B of FIG. 2B.

The method 300 may also include receiving a resource allocation message to allocate an uplink channel at block 318, and adjusting uplink transmission behavior in compliance with the second frequency band mode at 320. Receiving the resource allocation message to allocate an uplink channel at block 318 may include receiving a message from the remote cell 104 to allocate the uplink channel for the UE 110 to transmit data in compliance with the frequency band mode of the remote cell 104. The resource allocation message may include RF restrictions such as a maximum transmitting power, a center of the frequency channel, a spectrum emission mask, channel bandwidth and the like.

Adjusting uplink transmission behavior at block 320 may include transmitting data on the allocated uplink channel in compliance with the RF restrictions of the second frequency band mode of the remote cell 104. In one embodiment, the transmitting spectrum emission mask of the allocated uplink of the second frequency band mode may be tighter for the out-of-band transmission power than the in the first frequency band mode of the UE 110. In this case, the base station 104 may adjust the uplink power of the UE 110 differently than the uplink powers of other UEs which have the second frequency band mode as their native mode, to prevent the UE 110 from causing interference to other radio systems. The allocated uplink channel may entirely overlap a channel of the first frequency band mode of the UE 110 as illustrated in the example 200A of FIG. 2A. In another embodiment, the allocated uplink channel may partially overlap a channel of the first frequency band mode of the UE 110, as illustrated in the example 200B of FIG. 2B.

The method 300 may proceed to a different path when the UE 110 is in the idle state as indicated at block 304. The method 300 may include determining whether a reselection is allowed at block 322, reselecting a cell to enter based on a set of reselection criteria at block 324 and receiving broadcast message from a base station to indicate support for multiple frequency band modes at block 326.

Determining whether a reselection is allowed at block 322 may include deciding whether the UE 110 may enter the remote cell 104 as part of conventional cell reselection procedure. Determining whether the reselection is allowed may also include determining the number of overlapping frequency channels that the frequency band mode of the UE 110 may share with the frequency band mode of the base station 104. The interference level of each overlapping channel to a neighbor channel may also be considered. Reselecting the cell based on a set of reselection criteria at block 324 may include deciding which cell to enter based on a set of reselection criteria, if there are more than one nearby cell and if the reselection is allowed. The reselection criteria may include whether a link quality meets a minimum requirement, whether the target cell is in a preferred network, whether there are any security constraints, and the like.

Receiving a broadcast message from a base station to indicate a support for multiple frequency band modes at block 326 may include receiving a signaling message from the remote cell 104. The signaling message may indicate that the base station 104 supports one or more frequency band modes in addition to its native frequency band mode. If the UE 110 and the remote cell 104 do not support each other's frequency band mode, then the UE 110 may not roam into the remote cell 104. If the UE 110 and the cell 104 do support each other's frequency band modes, then the method 300 along the path of idle UE state may proceed to receiving a resource allocation message for uplink channel at block 318 and adjusting uplink transmission behavior at block 320 as described previously. The method 300 is for illustration only, and the steps may be arranged differently, divided, or combined. For example, the command for handing over to new cell at block 312 may contain the resource allocation message for downlink channel at block 314 and the resource allocation message for uplink channel at block 318.

Figure 4:
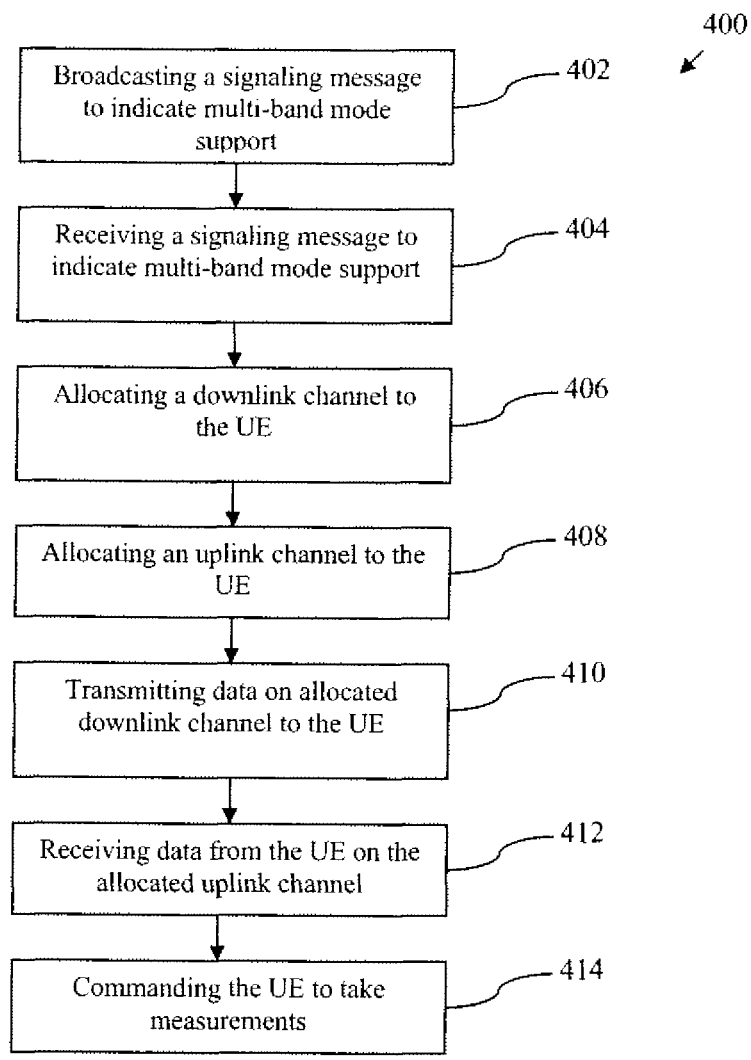
FIG. 4 illustrates an example method for supporting interworking between multiple frequency band modes at a base station.

FIG. 4 illustrates an example method 400 for support of interworking between multiple frequency band modes at a base station. The method 400 may include broadcasting a signaling message to indicate a support for multiple frequency band modes at 402, receiving a signaling message to indicate the support for multiple frequency band modes at block 404, and allocating a downlink channel to the UE at block 406. The method 400 may also include allocating an uplink channel to the UE at block 408, transmitting data on the allocated downlink to the UE at block 410, receiving data from the allocated uplink channel from the UE at block 412, and commanding the UE to take measurements at block 414. In one example embodiment, the method 400 may be implemented at the base station 104 of FIG. 1 or the wireless device 500 of FIG. 5. The method 400 is for illustration only and the steps of the method 400 may be arranged in a different sequence without departing from the invention of this example embodiment.

Broadcasting a signaling message to indicate a support for multiple frequency band modes at 402 may include broadcasting an existing system information message or a new signaling message to indicate to a roaming UE such as the UE 110 of FIG. 1 a support for multiple band modes. The broadcast message may include information on the frequency band modes that are supported, the information such as channel bandwidth, frequency channel numbering scheme, number of frequency channels, and the like. If the frequency band modes are well-known, alternatively the base station may only broadcast an identifier for each supported frequency band mode. The roaming UE 110, upon receiving the broadcast signaling message, may respond with a signaling message of its own to indicate its support for the multiple frequency band modes.

Receiving a signaling message to indicate the support for multiple frequency band mode at block 404 may include receiving the signaling message from the UE 110. The base station 104 may decide whether to accept the handover of the UE 110 by checking whether it supports the frequency band mode of the UE 110. The base station 104 may also consider a number of factors before deciding to accept the roaming UE 110. The factors may include the number of overlapping frequency channels, its available channels resources, the RF restrictions of both frequency band modes, and the like.

Allocating a downlink channel to the UE at block 406 may include adjusting its resource allocation to accommodate the frequency band modes of both the UE 110 and the base station 104. Allocating the downlink channel may include allocating a downlink channel in such a way that the interference to receiving data by the application on the neighboring channels is minimized. For example, as shown in FIG. 2, allocating a downlink channel may include allocating a downlink channel in the frequency band mode B1 for the UE 110 with the native frequency band mode B2. The channel 9200 may not be a good candidate because it is adjacent to a TV broadcast channel and high-level interferences may come from the high transmitting power of the TV channel. Allocating the downlink channel may also include allocating sub-carriers inside a channel, or allocating a channel away from the high interfering TV broadcast channel in this case.

Allocating an uplink channel to the UE at block 408 may include allocating an uplink channel in such a way that transmitting data on the allocated channel by the roaming UE 110 would meet a set of criteria for the transmitted signals. The criteria may include minimal interference to the neighbor channels, compliance with the transmitting power and spectrum emission mask restriction of the frequency band mode of the remote cell 104, and the like, while the RF restrictions of the UE's native frequency band mode is taken into consideration. Transmitting data on the allocated downlink to the UE 110 at block 410 may include transmitting data on the allocated downlink channel in compliance with the frequency band mode of the base station 104, while the RF restrictions of the UE's native frequency band mode are taken into consideration.

Receiving data from the allocated uplink channel at block 412 may include receiving data from the UE 110 on the allocated uplink channel in compliance with the RF restrictions of the frequency band mode of the base station 104. Commanding the UE 110 to take measurement at block 414 may include sending a signaling message to request that the UE 110 to take measurements and check the qualities of the allocated downlink channels and the uplink channels as part of a process for establishing communication channels between the UE 110 and the base station 104. At this point, the handover of the UE 110 in the active call state to the base station 104 is completed and the communication between the UE 110 and the base station 104 may proceed as in general case without concern about the interworking between different frequency band modes.

Figure 5:
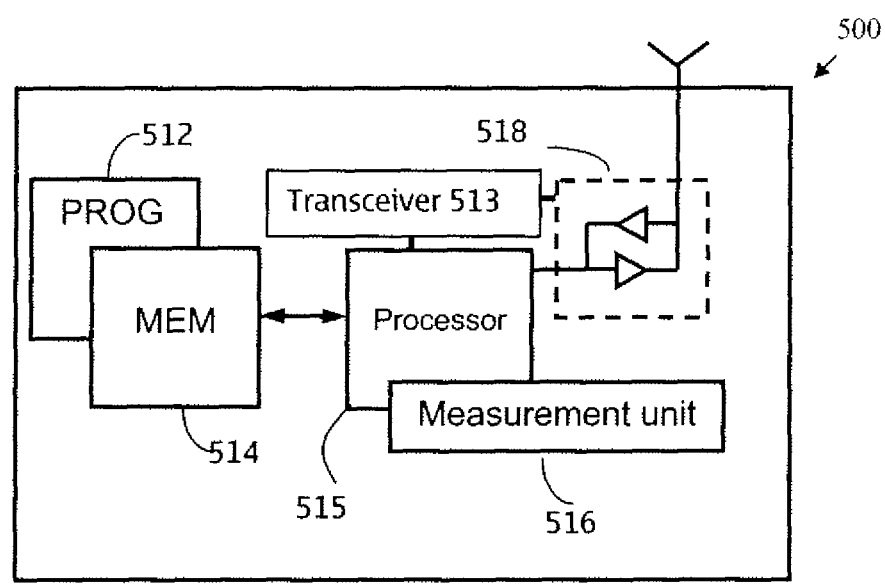
FIG. 5 illustrates an example wireless communication device.

Reference is made to FIG. 5 for illustrating a simplified block diagram of an example electronic device that is suitable for use in practicing the example embodiments of this invention. In FIG. 5, the device 500 may include a processor 515, a memory 514 coupled to the processor 515, and a suitable transceiver 513 (having a transmitter (TX) and a receiver (RX)) coupled to the processor 515, coupled to an antenna unit 518. The memory 514 stores a program (PROG) 512.

The processor 515 or some other form of generic central processing unit (CPU) or special-purpose processor such as digital signal processor (DSP), may operate to control the various components of the wireless device 500 in accordance with embedded software or firmware stored in memory 514 or stored in memory contained within the processor 515 itself. In addition to the embedded software or firmware, the processor 515 may execute other applications or application modules stored in the memory 514 or made available via wireless network communications. The application software may comprise a compiled set of machine-readable instructions that configures the processor 515 to provide the desired functionality, or the application software may be high-level software instructions to be processed by an interpreter or compiler to indirectly configure the processor 515.

The transceiver 513 is for bidirectional wireless communications with another wireless device. The transceiver 513 may provide frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to some analog baseband processing unit and/or the processor 515 or other central processing unit. In some embodiments, the transceiver 513, portions of the antenna unit 518, and an analog baseband processing unit may be combined in one or more processing units and/or application specific integrated circuits (ASICs).

The antenna unit 518 may be provided to convert between wireless signals and electrical signals, enabling the wireless device 500 to send and receive information from a cellular network or some other available wireless communications network or from a peer wireless device. In an embodiment, the antenna unit 518 may include multiple antennas to support beam forming and/or multiple input multiple output (MIMO) operations. MIMO operations may provide spatial diversity which can be used to overcome difficult channel conditions and/or increase channel throughput. The antenna unit 518 may include antenna tuning and/or impedance matching components, RF power amplifiers, and/or low noise amplifiers.

As shown in FIG. 5, the device 500 may further include a measurement unit 516, which measures the signal strength level that is received from another wireless device, and compare the measurements with a configured threshold. The measurement unit may be utilized by the device 500 in conjunction with various example embodiments of the invention, as described herein. The PROG 512 is assumed to include program instructions that, when executed by the associated processor, enable the electronic device to operate in accordance with the exemplary embodiments of this invention, as discussed herein.

In general, the various example embodiments of the device 500 may include, but are not limited to, part of a base station, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Without in any way limiting the scope, interpretation, or application of the claims appearing below, a technical effect of one or more of the example embodiments disclosed herein may be a method for interworking between different frequency band modes with overlapping frequency channels.

Embodiments of the present invention may be implemented in software, hardware, application logic or a combination of software, hardware and application logic. The software, application logic and/or hardware may reside on a mobile station or user equipment, a base station or other mobile computing device. If desired, part of the software, application logic and/or hardware may reside on a mobile station, part of the software, application logic and/or hardware may reside on a base station, and part of the software, application logic and/or hardware may reside on a second mobile station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

If desired, the different functions discussed herein may be performed in any order and/or concurrently with each other. Furthermore, if desired, one or more of the above-described functions may be optional or may be combined.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes exemplifying embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor; and
at least one memory storing computer program code;
the at least one memory and the computer program code configured, with the at least one processor, to cause the apparatus at least to:
reselect, while operating according to a first frequency band mode, to a base station operating according to a second frequency band mode, wherein the first frequency band mode and the second frequency band mode are different frequency band modes having at least one at least partially overlapping frequency channel;
receive at least one resource allocation message to allocate from the base station at least one of a downlink channel and an uplink channel of the at least one partially overlapping frequency channel, the resource allocation of said at least one of a downlink channel and an uplink channel complying to at least one of a plurality of radio frequency restrictions of the second frequency band mode and to at least one of a plurality of radio frequency restrictions of the first frequency band mode; and
receive information indicating whether the base station, while operating according to the second frequency band mode, can support a user equipment operating according to at least one of a plurality of radio frequency restrictions of the first frequency band mode without the base station operating according to the first frequency band mode,
wherein the at least one of a plurality of radio frequency restrictions of the first frequency band mode restricts at least one radio frequency parameter differently than a corresponding radio frequency restriction of the second frequency band mode restricts the radio frequency parameter.

2. The apparatus according to claim 1, the at least one memory and the computer program code further configured, with the at least one processor, to cause the apparatus at least to:
decide whether to reselect to the base station at least in part based on the received information.

3. The apparatus according to claim 1, wherein at least one of the at least one at least partially overlapping frequency channel has a different channel number in the first and second frequency band modes.

4. The apparatus according to claim 1, the at least one memory and the computer program code further configured, with the at least one processor, to cause the apparatus at least to:
signal that the apparatus can support the second frequency band mode with a plurality of radio frequency restrictions associated with the first frequency band mode.

5. The apparatus according to claim 4, wherein the signal is sent to a serving base station.

6. The apparatus according to claim 1, wherein the first frequency band mode and the second frequency band mode are one of a Long Term Evolution Band and a second Long Term Evolution Band frequency band mode.

7. The apparatus according to claim 1, wherein the at least one of a plurality of radio frequency restrictions of the second frequency band mode and the at least one of a plurality of radio frequency restrictions of the first frequency band mode respectively restricting at least a parameter associated with at least one of a maximum transmitting power, a center of the frequency channel, a spectrum emission mask, an RF receiver filter and a channel bandwidth.

8. The apparatus according to claim 1, wherein the first and second frequency band modes comprise an uplink frequency sub-band and a downlink frequency sub-band and associated radio frequency restrictions, the uplink frequency sub-band and the downlink sub-band not overlapping.

9. An apparatus, comprising:
   at least one processor; and
   at least one memory storing computer program code;
   the at least one memory and the computer program code configured, with the at least one processor, to cause the apparatus at least to:
   receive, while operating according to a second frequency band mode a request for reselection for a user equipment operating according to a first frequency band mode, wherein the first frequency band mode and the second frequency band mode are different frequency band modes having at least one at least partially overlapping frequency channel;
   send towards the user equipment at least one resource allocation message to allocate at least one of a downlink channel and an uplink channel of the at least one partially overlapping frequency channel, the resource allocation of said at least one of a downlink channel and an uplink channel complying to at least one of a plurality of radio frequency restrictions of the second frequency band mode and to at least one of a plurality of radio frequency restrictions of the first frequency band mode; and
   send information indicating whether the base station, while operating according to the second frequency band mode, can support a user equipment operating according to at least one of a plurality of radio frequency restrictions of the first frequency band mode without the base station operating according to the first frequency band mode,
   wherein the at least one of a plurality of radio frequency restrictions of the first frequency band mode restricts at least one radio frequency parameter differently than a corresponding radio frequency restriction of the second frequency band mode restricts the radio frequency parameter.

10. The apparatus according to claim 9, wherein the sending comprises sending a broadcast message.

11. The apparatus according to claim 9, the at least one memory and the computer program code further configured, with the at least one processor, to cause the apparatus at least to:
   receive an indication that the user equipment can support the second frequency band mode with a plurality of radio frequency restrictions associated with the first frequency band mode.

12. The apparatus according to claim 11, the at least one memory and the computer program code further configured, with the at least one processor, to cause the apparatus at least to:
   decide whether to allow the request for reselection based at least in part on the received indication.

13. The apparatus according to claim 9, the at least one memory and the computer program code further configured, with the at least one processor, to cause the apparatus at least to:
   decide whether to allow the request for reselection based at least in part on the number of the at least one at least partially overlapping frequency channels.

14. The apparatus according to claim 9, the at least one memory and the computer program code further configured, with the at least one processor, to cause the apparatus at least to:
   decide whether to allow the request for reselection based at least in part on considering an interference level of at least one of the at least partially overlapping channels to a neighbor channel.

15. The apparatus according to claim 9, wherein the resource allocation message comprises at least one radio frequency restriction parameter.

16. A non-transitory computer readable storage product, comprising executable instructions which, when read and executed by a programmable mobile station, cause the programmable mobile station to perform:
   reselecting, while operating according to a first frequency band mode, to a base station operating according to a second frequency band mode, wherein the first frequency band mode and the second frequency band mode are different frequency band modes having at least one at least partially overlapping frequency channel; and
   receiving at least one resource allocation message to allocate from the base station at least one of a downlink channel and an uplink channel of the at least one partially overlapping frequency channel, the resource allocation of said at least one of a downlink channel and an uplink channel complying to at least one of a plurality of radio frequency restrictions of the second frequency band mode and to at least one of a plurality of radio frequency restrictions of the first frequency band mode; and
   receiving information indicating whether the base station, while operating according to the second frequency band mode, can support a user equipment operating according to at least one of a plurality of radio frequency restrictions of the first frequency band mode without the base station operating according to the first frequency band mode,
   wherein the at least one of a plurality of radio frequency restrictions of the first frequency band mode restricts at least one radio frequency parameter differently than a corresponding radio frequency restriction of the second frequency band mode restricts the radio frequency parameter.

17. The non-transitory computer readable storage product of claim 16, causing the programmable mobile station to further perform:
   deciding whether to reselect to the base station at least in part based on the received information.

18. The non-transitory computer readable storage product of claim 16, wherein at least one of the at least one at least partially overlapping frequency channel has a different channel number in the first and second frequency band modes.

19. The non-transitory computer readable storage product of claim 16, causing the programmable mobile station to further perform:
   signaling that the apparatus can support the second frequency band mode with a plurality of radio frequency restrictions associated with the first frequency band mode.

* * * * *